US006236479B1

(12) United States Patent
Gosselin et al.

(10) Patent No.: US 6,236,479 B1
(45) Date of Patent: May 22, 2001

(54) SPACE-DIVISION OPTICAL SWITCHING SYSTEM HAVING A MULTICHANNEL ACOUSTO-OPTICAL DEFLECTOR

(75) Inventors: Stéphane William Raymond Gosselin, Pleumeur-Bodou; Jacques Sapriel, Montrouge, both of (FR)

(73) Assignee: France Telecom (FR)

( * ) Notice: Subject to any disclaimer, the term of this patent is extended or adjusted under 35 U.S.C. 154(b) by 0 days.

(21) Appl. No.: 09/083,758

(22) Filed: May 22, 1998

(30) Foreign Application Priority Data

May 26, 1997 (FR) .................................................. 97 06375

(51) Int. Cl.[7] .......................... H04B 10/00; H04B 10/10; H04B 10/30
(52) U.S. Cl. .......................... 359/117; 359/128; 359/139
(58) Field of Search .................................... 359/117, 128, 359/139

(56) References Cited

U.S. PATENT DOCUMENTS

| 5,086,341 | * | 2/1992 | Tamada | 358/201 |
|---|---|---|---|---|
| 5,771,320 | * | 6/1998 | Stone | 385/16 |
| 5,953,143 | * | 9/1999 | Sharony | 359/128 |

OTHER PUBLICATIONS

Harris D O et al.: "Acousto–Optic Photonic Switch" Optics Letter, vol. 14, No. 21, Nov. 1, 1989, pp. 1177–1179.
Patent Abstracts of Japan vol. 011, No. 337 Nov. 5, 1987.
Patent Abstracts of Japan vol. 011, No. 373 Dec. 5, 1987.
Patent Abstracts of Japan vol. 006, No. 100 Jun. 9, 1982; and JP 57 034529A.
Huang, P.C. Performance of 4*4 optical crossbar switch utilising acousto–optic deflector, Electronics Letters, Feb. 16, 1989 vol. 25 Issue: 4, pp. 252–253.*
Yao Li, Optical nonblocking multicast and broadcast interconnects using multidimensional multiplexing concepts, Journal of Lightwave Technology, Feb. 1996 vol. 14 Issue: 2 pp. 129–138.*

* cited by examiner

Primary Examiner—Leslie Pascal
Assistant Examiner—Agustin Bello
(74) Attorney, Agent, or Firm—Blakely Sokoloff Taylor & Zafman

(57) ABSTRACT

A space-division optical switching system comprising a multichannel acousto-optical deflector between a plurality of inlet fibers and a plurality of outlet fibers, together with both a plurality of inlet microlenses for collimating beams from the inlet fibers on the deflector and also, downstream from the deflector, a Fourier lens with the said deflector being located in the focal plane thereof, the system including a second multichannel acousto-optical deflector disposed downstream from said lens in the image focal plane thereof, together with a plurality of outlet microlenses serving to focus the beams from the second deflector on the outlet fibers.

10 Claims, 2 Drawing Sheets

SPACE-DIVISION OPTICAL SWITCHING SYSTEM HAVING A MULTICHANNEL ACOUSTO-OPTICAL DEFLECTOR

The present invention relates to a space-division optical switching system having a multichannel acousto-optical deflector.

The system proposed by the invention is advantageously used in the field of optical telecommunications, in particular to interconnect in reconfigurable manner, strips of monomode optical fibers conveying information in optical form at a wavelength of 1.55 µm or of 1.3 µm.

TECHNOLOGICAL BACKGROUND OF THE INVENTION

Monomode optical fibers are making it possible to convey data at higher and higher rates in optical form. At present, switching such optical signals at nodes in optical telecommunications networks requires the optical signals to be converted into electrical signals which are then processed electronically and subsequently converted back into optical signals at the outlet from the switching system. Such complex electronic processing of large volumes of data might become a bottleneck in future telecommunications networks.

Thus, optical switching systems that process the optical signals directly and transparently constitute alternatives to electronic systems when the data rates involved are very large and the data does not need to be demultiplexed.

Space-division optical switching systems are already known. For example, an N×N space-division optical switching system makes it possible to interconnect in reconfigurable manner two sets of N optical fibers, each of the N inlet optical fibers being capable of being optically connected, via a channel of the switching system to any one of the available outlet fibers. Important characteristics of a space-division switching system are the number of elementary components required, the complexity of the algorithm for reconfiguring the switch, insertion losses (attenuation of the optical signal on passing through the switch), and cross-talk noise (interference coming from other channels and associated with the channels being imperfectly isolated from one another).

Space-division optical switching systems can be classified depending on the type of topology used.

In particular, multistage architectures consist in cascading some number of 1×2, 2×2 and/or 2×1 elementary switching stages so as to obtain larger capacity systems, of capacity N×N where N >2. That type of modular architecture is well adapted to certain kinds of integrated optical technology, but it imposes a compromise between the number of elementary switches (which is not less than about $N.\log_2 N$) and the complexity of the algorithm for reconfiguring the switching system. In addition, since the optical signal passes through a plurality of elementary switching stages, insertion losses and/or cross-talk noise can become large when the capacity N exceeds 8.

Broadcast-and-shutter type architectures use only one stage of switching. For each inlet they consist in sharing the optical power uniformly over all of the outlets and then in shutting off outlets that are not desired. The reconfiguration algorithm is very simple, however the number of elementary components is of the order of $N^2$. In addition, insertion losses and/or cross-talk noise can become large at large capacity.

Finally, deflection architectures consist in actively directing each inlet towards a desired outlet. They comprise a single switching stage. The reconfiguration algorithm is very simple and the number of elementary components is of order N. Insertion losses and cross-talk noise do not depend, a priori, on capacity.

The system proposed by the invention is a switching system that makes use of acousto-optical deflection: it belongs to the last-mentioned category.

Acousto-optical deflectors make use of ultrasound wave propagation in certain materials to deflect light beams. For a general description of such deflectors, reference may advantageously be made to:

[1] J. Sapriel: Acousto-optics (Wiley, N.Y., 1979).

Ultrasound waves are produced by a piezoelectric transducer fed with a high frequency electrical signal. The ultrasound wave propagates perpendicularly to the surface of the transducer and deforms the acousto-optical material locally. These deformations by the photoelastic effect induce variations in the refractive index of the material and thus generate a diffraction grating capable of deflecting light beam. The effectiveness of deflection depends on wavelength, on the dimensions of the transducer, on the ultrasound power, and on a coefficient referred to as the "figure of merit" of the material. This coefficient is associated with the material and the configuration of the acousto-optical interaction in the material. The effectiveness of deflection increases with increasing figure of merit of the material. The angle of deflection is proportional to the ultrasonic frequency used, and it is therefore relatively simple to reconfigure the deflector. A reconfiguration time is associated with the speed of the ultrasound waves, and with the diameter of the light beam, and typically it can be much less than a microsecond.

PRIOR ART

Space-division optical switch architectures operating by acousto-optical deflection have already been proposed, in particular in:

[2] "Acousto-optic photonic switch", Dan Owen Harris and A. Vanderlugt, Optics Letters, Vol. 14, No. 21, pp. 1177–1179 (1989),

[3] "Demonstration of a photonic space switch utilizing acousto-optic elements", W. E. Stephens, P. C. Huang, T. C. Banwell, L. A. Reith and S. S. Cheng, Optical Engineering, Vol. 29, No. 3, pp. 183–190 (1990),

[4] "Multichannel acousto-optic crossbar switch", Dan Owen Harris, Applied Optics, Vol. 30, No. 29, pp. 4245–4256 (1991).

Those architectures, referred to as "crossbar"switches, use a multichannel acousto-optical deflector and enable two strips of N optical fibers to be interconnected (N=4 or 8 in references [2], [3], [4]). Each deflector channel is embodied on the top face of the acousto-optical crystal by its own piezoelectric transducer and is associated with one of the optical inputs of the system, thereby making it possible to control the destination of each of the input light beams independently. Since the ultrasound waves propagate perpendicularly in this case to the plane defined by the strip of inlet fibers, the deflected optical beams are distributed over a matrix of points. A lens—which is cylindrical or spherical, depending on circumstances—placed at a distance from the multichannel deflector corresponding to the focal length of said lens (the so-called "Fourier" configuration) rectifies the light beams onto the axis of the lens which is parallel to the axis of the fibers.

In publication [2], said lens is a spherical lens which makes it possible to reinject onto the outlet fiber axis for a 1×N system.

However, it should be observed that the architecture proposed in that publication has only one optical inlet and is effective only for providing 1×N switching.

For a system having a plurality of optical inlets, an architecture having a spherical Fourier lens does not enable reinjection into the outlet fibers to take place on the axis of the fibers, thereby giving rise to prohibitive injection losses when the outlet fibers are monomode fibers. To minimize injection losses, it then becomes necessary to use additional cylindrical lenses, thereby complicating the architecture of the system.

Thus, in publication [4], two cylindrical lenses are added upstream from the deflector and it is proposed to replace the Fourier spherical lens by two cylindrical lenses of different focal lengths. However, even with optimum focal lengths, the efficiency of reinjection into the outlet monomode fibers is less than 1/N.

Another technique that has been proposed for conveying beams towards the outlet fiber strip—corresponding to the architecture described in [3]—consists in using a cylindrical Fourier lens and N fibers with lenses for each outlet port, giving a total of $N^2$ fibers organized in a matrix, followed by passive N to 1 fiber couplers. Nevertheless, in that case also, losses associated with the couplers limit reinjection efficiency to 1/N.

Thus, in particular when the outlet fibers are of the monomode type—which is naturally desirable for enabling the system to be integrated in an optical telecommunications network, since the optical signal is generally conveyed using monomode fibers—the architectures used for reinjection gives results that are mediocre and do not make it possible to envisage having strips with more than four fibers.

The main object of the invention is to propose an architecture that is simple and that makes it possible to solve the problem posed by reinjecting light into the outlet fibers of a multichannel acousto-optical optical deflector switch.

Also, a highly desirable characteristic for an optical telecommunications system is to be insensitive to polarization of the light. Unfortunately, as a general rule, many space-division optical switching systems that have been studied so far present sensitivity to polarization of the same order as, or greater than 1 decibel. Acousto-optical interaction is also sensitive to polarization. Thus, the polarization sensitivity of the system described in [3] is 0.8 decibels. Although that figure is low, it nevertheless puts a severe limit on the extent to which such systems can be cascaded in a telecommunications network.

Another object of the invention is therefore to propose a space-division optical switching system which is independent of polarization even if the acousto-optical interaction material is itself sensitive to polarization.

Also, another drawback of presently known multichannel acousto-optical deflector systems appears when it is desired to switch optical signals at telecommunications wavelengths. The systems that have been investigated so far operate at wavelengths that are visible or in the near infrared, and the acousto-optical materials employed, such as tellurium oxide or gallium phosphide are unsuitable for telecommunications wavelengths because of the low deflection efficiencies obtained at such wavelengths.

Another object of the invention is therefore to solve this problem.

Yet another object of the invention is to reduce the cross-talk noise of prior art systems.

BRIEF SUMMARY OF THE INVENTION

The invention proposes a space-division optical switching system comprising a multichannel acousto-optical deflector between a plurality of inlet fibers and a plurality of outlet fibers, together with both a plurality of inlet microlenses for collimating beams from the inlet fibers on the deflector and also, downstream from the deflector, a Fourier lens with the said deflector being located in the focal plane thereof, the system including a second multichannel acousto-optical deflector disposed downstream from said lens in the image focal plane thereof, together with a plurality of outlet microlenses serving to focus the beams from the second deflector on the outlet fibers.

Such a system makes it possible to achieve good quality reinjection into the outlet fibers whether they are monomode or multimode, while also providing an architecture that is simple because it requires only one Fourier lens instead of a plurality of cylindrical lenses.

Advantageously, the Fourier lens is invariant in rotation about its optical axis. Consequently, the optical beams remain circular throughout their travel through the system. There is no elliptical beam manipulation which would complicate the optical system and adjustment of its alignment.

Also advantageously, the deflectors on either side of the Fourier lens are identical and are controlled by a common ultrasound frequency comb.

More generally, the inlet subassembly constituted by a plurality of inlet fibers and microlenses, together with the deflector disposed in the object focal plane of the Fourier lens is identical to the subassembly constituted by the plurality of outlet fibers and microlenses, together with the deflector disposed in the image focal plane of the Fourier lens.

This symmetry simplifies both the manufacturing process and the control electronics of the system.

Also preferably, the deflectors on either side of the lens are rotated through 90° relative to each other about the optical axis of the Fourier lens.

As a result, the system has the advantage of being insensitive to light polarization.

In a particularly advantageous architecture, the system comprises a plurality of modules constituted by systems having a common Fourier lens.

BRIEF DESCRIPTION OF THE DRAWINGS

Other characteristics and advantages of the invention appear from the following description. The description is purely illustrative and non-limiting. It should be read with reference to the accompanying drawings, in which.

DETAILED DESCRIPTION

An Elementary Embodiment (Module)

Figure 1:
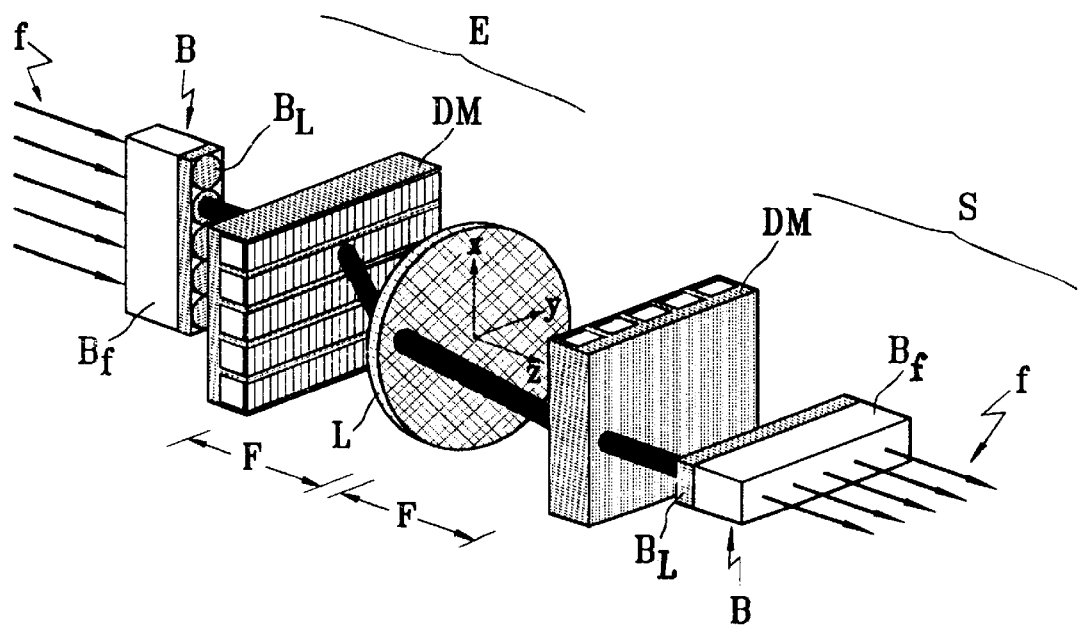
FIG. 1 is a diagrammatic perspective view showing an elementary embodiment (module) of the invention.
Figure 2A:
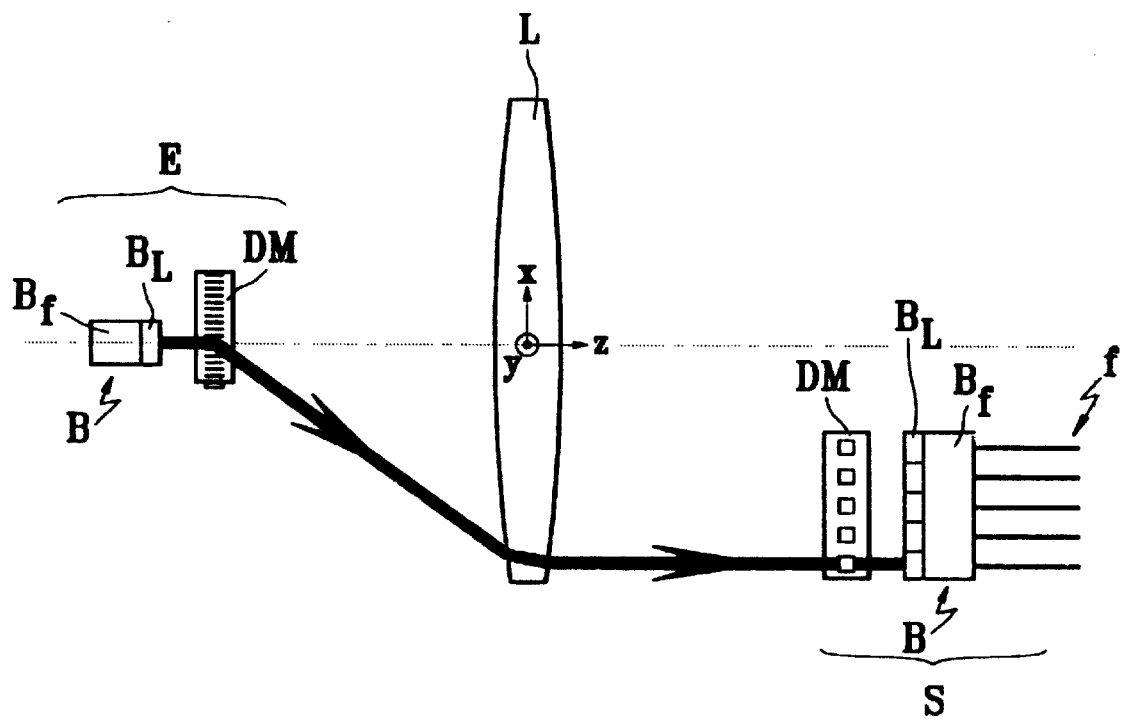
FIGS. 2a and 2b are diagrams of the system of FIG. 1 as seen from above and from the side.
Figure 2B:
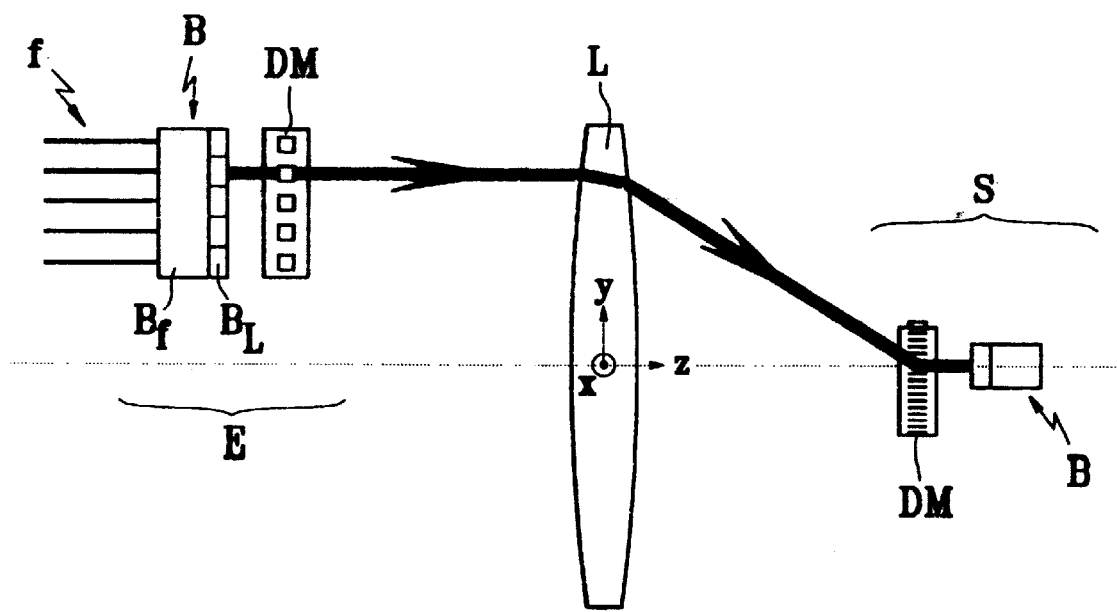

The module shown in FIGS. 1 and 2a, 2b is constituted by an inlet subassembly E, a spherical lens L, and an outlet subassembly S.

The outlet subassembly S is identical to the inlet subassembly E. The two subassemblies E and S are disposed on opposite sides of the lens L and they are rotated relative to each other through 90° about the optical axis Z of said lens L. More precisely, they are equivalent to each other by symmetry about the plane of the lens followed by rotation through π/2 about the axis Z. Thus, the ultrasound frequencies to be used in the outlet subassembly S are the same as those used in the inlet subassembly E. The symmetry of the module makes it possible to interchange the inlet and outlet roles.

Each inlet or outlet subassembly E or S is made up of a strip $B_f$ of N monomode fibers f, a strip $B_L$ of N microlenses, and a multichannel acousto-optical deflector DM.

The strip $B_f$ and the strip $B_L$ are assembled together by adhesive, for example, to constitute an inlet/outlet strip referenced B in the figure. The number of fibers per strip may typically be as great as 16.

The microlens strip $B_L$ serves to collimate the inlet beams and focus the outlet beams on the fibers f. This collimation makes it possible to control the beams over a certain distance and to maximize the number of directions in which the multichannel deflectors DM can deflect, i.e. the number N of fibers f per inlet/outlet strip B.

By way of example, gallium arsenide is used as the acousto-optical material for the deflectors DM.

Gallium arsenide makes it possible to obtain high figure of merit. For a general description of the acousto-optical properties of gallium arsenide, reference may advantageously be made to:

[5] "Elasto-optic and electro-optic properties of GaAs", N. Suzuki and K. Tada, Japanese Journal of Applied Physics, Vol. 23, 1011 (1984).

Gallium arsenide gives deflection efficiencies of about 20% at telecommunications wavelengths, in the context of an 8×8 system with ultrasound powers of the order of 1 watt per channel.

In a variant, it would also be possible with comparable efficiency to use indium phosphide, whose acousto-optical properties are described, for example, in:

[6] "Electro-optic properties and Raman scattering in InP", N. Suzuki and K. Tada, Japanese Journal of Applied Physics, Vol. 23, 291 (1984).

However, as emphasized in:

[7] "New developments of resonant acousto-optics in semiconductors" J. Sapriel, P. Renosi, and P. Le Berre, SPIE Vol. 2643, pp. 257–262 (1995), gallium arsenide has better mechanical properties, lends itself better to the polishing required for manufacturing deflectors, and suffers from lower acoustic attenuation (about 3 dB/cm at the frequency of 400 MHz, compared with 13 dB/cm for indium phosphide at the same frequency). It is therefore preferable.

The architecture described could naturally be applied to wavelengths other than telecommunications wavelengths, and could possibly use other acousto-optical materials.

In particular, it would also be advantageous to use III–V or II–VI semiconductor alloys, e.g. under conditions close to acousto-optical resonance making it possible to achieve considerably greater deflection efficiencies than that of gallium arsenide at telecommunications wavelengths of 1.3 μm and 1.55 μm.

The transducers of the deflectors DM are made of lithium niobate (Y+36° cut), said material having very good piezoelectric performance.

The deflectors DM and the lens L are disposed in a Fourier configuration, which means that the deflectors DM are disposed on either side of the lens L, at a distance therefrom corresponding to its focal length F.

In the text below, X and Y designate the two directions in which the outlet and inlet strips B extend, these directions X and Y together with the optical axis Z of the lens L defining a rectangular frame of reference.

The lens L performs three functions.

a) It converts the deflection angles in the X-Z plane of the beams output from the inlet multichannel deflector DM into X positions on the outlet module S (FIG. 2a). When projected on the X-Z plane, the beams output by the lens L are parallel to the axis Z of said lens L. Thus, each deflection angle of the inlet multichannel deflector is caused to correspond with one channel of the outlet strip B. As a result, a one-to-one relationship is established between the ultrasound frequencies of the inlet deflector and the outlet channels: to provide a link between an inlet i to an outlet i, it is necessary to use an ultrasound frequency f(j) on the channel i of the inlet deflector.

b) In the Y-Z plane, the lens L deflects the beams it receives from the inlet module (beams whose projections on the Y-Z plane are parallel to the optical axis Z) towards the outlet strip B (cf. FIG. 2b) by converting the positions of incidence of the beams along the Y axis on the lens L into angles of incidence on the outlet subassembly S. This conversion is symmetrical to the preceding conversion. The outlet multichannel deflector DM then rectifies the beams back onto the axis of the outlet fibers (Z axis). As a result, a one-to-one relationship is established between the ultrasound frequencies of the outlet deflector and the inlet channels. This one-to-one relationship is exactly the same as that which exists between the ultrasound frequencies of the inlet deflector and the outlet channels: for inlet link i to outlet i, it is necessary to use the frequency f(i) on channel i of the outlet deflector.

c) A final function of the lens L is to collimate the beams so that they have the same size in the outlet deflector as in the inlet deflector.

It will be observed that these three functions are provided in a Fourier configuration by a converging lens that is invariant in rotation about its optical axis (e.g. a spherical lens), providing the angles of the beams relative to the optical axis of the lens remain sufficiently small (paraxial approximation). This condition is typically fulfilled with the deflectors DM used herein.

It will also be observed that the inlet/outlet symmetry of the system appears not only geometrically but also in terms of switch control. Both multichannel deflectors use the same "comb" of ultrasound frequencies f(j), where i varies over the range 1 to N (N =the number of fibers per strip). To establish a link from inlet i to outlet i, it is necessary to use ultrasound frequency f(j) on inlet deflector channel i and frequency f(i) on channel i of the outlet deflector. Finally, all of the optical surfaces encountered by the light beam are preferably covered in anti-reflection layers to minimize reflection losses at the working wavelengths.

Multiple Embodiment (Having a Plurality of Modules)

Figure 3A:
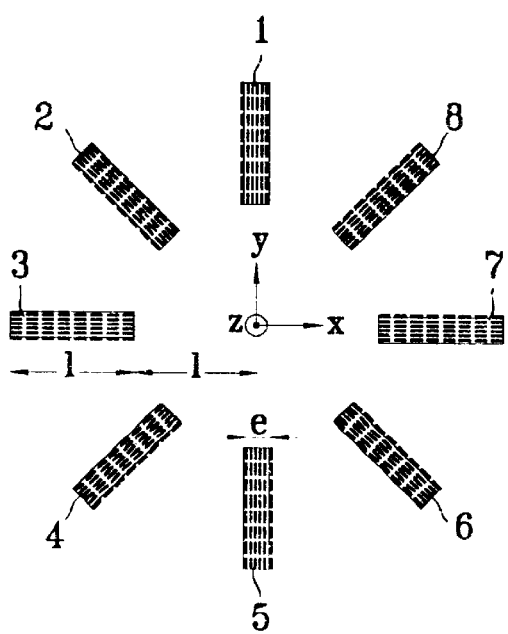
FIGS. 3a and 3b show another embodiment of the invention that is also possible and in which a plurality of elementary modules of the type shown in FIG. 1 are grouped together in optimum manner.
Figure 3B:
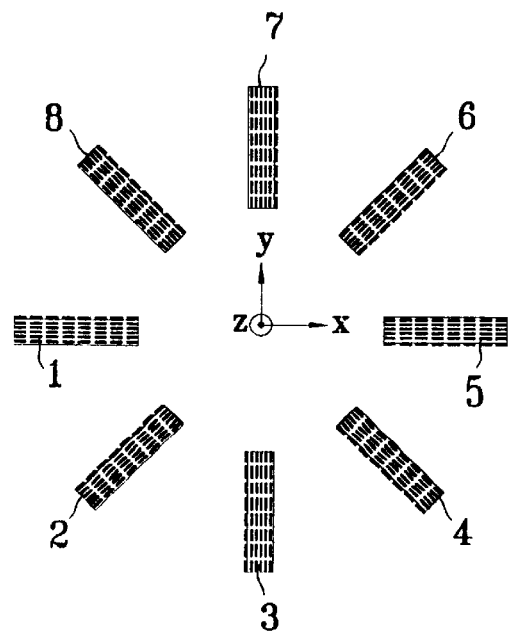

Reference is now made to FIGS. 3a and 3b showing another possible embodiment.

Electrical frequency band constraints on piezoelectric transducers give rise to constraints on the deflection angles of the multichannel deflectors. Thus, the maximum deflection angle is typically twice the minimum deflection angle.

The deflection angles multiplied by the focal length F of the lens L give the channel positions of the deflectors relative to the optical axis of said lens. Thus the outlet subassembly S and the inlet subassembly E are not centered on the optical axis Z of the lens, but are offset thereabout, with the distance between said axis and the first channel of a deflector being typically equal to the width ] of the deflectors.

It is also known that the elementary system described with reference to FIGS. 1 and 2a, 2b is invariant relative to simultaneous rotation of both subassemblies E and S about the axis Z of the lens L.

These two considerations make it possible to dispose a plurality of inlet subassemblies E and a plurality of outlet subassemblies S around the optical axis Z of the Fourier lens L, in a configuration reminiscent of a revolver "cylinder", i.e. in a configuration in which a plurality of inlet multichannel deflectors DM are disposed in a star configuration in the object focal plane of the lens L about the optical axis Z of said lens, while the same number of outlet multichannel deflectors DM is disposed in the image focal plane of the lens L in a configuration that is complementary to that of the inlet deflectors. This juxtaposition is possible providing the overall bulk of the multichannel deflectors is not excessive.

In the example shown in FIGS. 3a and 3b, the number of inlet deflectors, i.e. the number of outlet deflectors, is M=8 for N=8 fibers per strip.

FIG. 3a shows the inlet multichannel deflectors which are referenced 1 to 8, and FIG. 3b shows the outlet multichannel deflectors corresponding respectively to the deflectors 1 to 8, said outlet deflectors being referenced 1' to 8' and being offset by $\pi/2$ in the X-Y plane relative to the respective positions of the deflectors 1 to 8.

This provides a system comprising eight 8×8 switches in a volume that is substantiality identical to that of an 8×8 switch as shown in FIGS. 1 and 2a, 2b. It can be seen in FIGS. 3a and 3b that the size of the multichannel deflectors does not pose a problem, providing the width ] of each deflector (the dimension associated with the number of channels) is greater than the thickness e thereof (the dimension associated with the ultrasound propagation direction). In practice, since the light beams used are circular, the ratio ]/e is of the same order as the number N of fibers per strip, and it is therefore easy to juxtapose up to M=8 multichannel deflectors around the optical axis of the lens L, at a distance from the axis which is equal to the width ] of the deflectors.

An Example of Dimensions

The following table gives an example of the dimensions used for N monomode fibers per strip where N=8. The acousto-optical material is gallium arsenide, and the wavelength is 1.55 $\mu$m.

Similar dimensions will be obtained with indium phosphide and/or using a wavelength of 1.31 microns, or indeed with multimode outlet fibers.

Similarly, the number of fibers per strip could be increased to 16 or even 32, with a corresponding increase in the dimensions of the system and lower efficiency of the multichannel deflectors.

This dimensioning is naturally just as applicable to a single 8×8 system as it is to a multiple M×(8×8) is system, where M can be as great as 8. The values given are by way of indication (accuracy of about 10%).

TABLE 1

Example dimensions for the architecture proposed

| | |
|---|---|
| Number of fibers per strip N | 8 |
| Spacing of fibers on the strip (mm) | 0.75 |
| Focal length of collimation microlenses (mm) | 2 |
| Diameter of light beams (mm) | 0.4 |
| Focal length of Fourier lens (mm) | 90 |
| Diameter of Fourier lens (mm) | 25 |
| Dimensions of the system of FIGS. 3a and 3b, i.e. having 8 modules (mm) | 200 × 25 × 25 |
| Dimensions of sound beams (mm) | 1.5 × 0.6 |
| Ultrasound frequency band (MHz) | 200–400 |
| Mean efficiency of multichannel deflectors, for 1 watt ultrasonic per channel (%) | 20 |
| Estimated signal to cross-talk ratio (dB) | 60 |
| Typical access type ($\mu$s) | 0.2 |

Advantages of the Proposed Architectures

The systems described above present numerous advantages.

In particular, they present the advantages of space-division optical switching architectures of the vector-matrix type using acousto-optical deflection.

Also, they make it possible to solve the drawbacks of prior art structures.

In particular, they provide very high performance in terms of light reinjection into monomode outlet fibers, and they do so without requiring cylindrical lenses in the light paths, thereby avoiding the need to handle elliptical beams and facilitating alignment.

Also, constraints on focusing the beams by the Fourier lens are relaxed. It is the outlet microlenses that provide focusing.

It will also be observed that a characteristic intrinsic to the architecture proposed is its insensitivity to polarization, and that this applies even if the acousto-optical material used is itself sensitive to polarization (which is often the case). This is due to the fact that the directions of sound propagation in the two deflectors are orthogonal.

Also, one of the major advantages of the proposed structure lie in the outlet multichannel deflector providing active reinjection, thereby ensuring reinjection efficiency that is independent of the number N of fibers per strip, and that is better than the efficiency of passive reinjection once the number N of fibers per strip exceeds 4.

This active reinjection also provides better performance in terms of cross-talk. The outlet deflector for each outlet channel selects the origin of the optical signal to be reinjected. As a result, the resulting ratio of signal to cross-talk is of the order of the square of that obtained in architecture using passive reinjection, which corresponds to about 60 decibels.

It will also be observed that the multiple version of the proposed architecture can advantageously be applied in multicolor light transport networks (i.e. using multiple wavelengths). An optical distributor begins by separating the wavelengths of the inlet fibers, and then applies space-division switching to the signals obtained in this way. A space-division switch must be associated with each wavelength, and it is therefore most advantageous to be able to juxtapose as many space division switches as there are wavelengths multiplexed on each inlet fiber to the distributor.

In particular, in its multiple version, the proposed architecture provides considerable saving in terms of compactness when a plurality of space-division switches need to be used in parallel, as when using an optical distributor.

It should also be observed that a multiple M×(N×N) system is as simple to manufacture as a single N×N system since the 2M subassemblies to be manufactured (fiber strips and microlenses + multichannel deflector) are identical and therefore lend themselves well to mass production. It is even possible to envisage procedures for optically prealigning each subassembly, which procedures will be identical for all of the subassemblies, thereby simplifying alignment of the overall system once all of the subassemblies have been juxtaposed around the Fourier lens.

It should also be observed that another advantage of the structures described above lie in the acousto-optical materials they use making it possible to operate at telecommunications wavelengths, and in particular at 1.3 μm and at 1.55 μm.

What is claimed is:

1. A space-division optical switching system comprising a multichannel acousto-optical deflector between a plurality of inlet fibers and a plurality of outlet fibers, together with both a plurality of inlet microlenses for collimating beams from the inlet fibers on the deflector and also, downstream from the deflector, a Fourier lens with the said deflector being located in the focal plane thereof, the system including a second multichannel acousto-optical deflector disposed downstream from said lens in the image focal plane thereof, together with a plurality of outlet microlenses serving to focus the beams from the second deflector on the outlet fibers.

2. A system according to claim 1, wherein the Fourier lens is invariant in rotation about its optical axis.

3. A system according to claim 1, wherein the deflectors on either side of the lens are identical and are controlled by the same ultrasound frequency comb.

4. A system according to claim 1, wherein the subassembly constituted by the plurality of inlet fibers and microlenses, and the deflector disposed in the object focal plane of the lens is identical to the subassembly constituted by the plurality of outlet fibers and microlenses together with the deflector disposed in the image focal plane of the lens.

5. A system according to claim 1, wherein the acousto-optical material of the deflectors is gallium arsenide.

6. A system according to claim 1, wherein the acousto-optical material of the deflectors is indium phosphide.

7. A space-division optical switching system, comprising a plurality of modules each constituted by the system of claim 1 and having the Fourier lens in common.

8. The use of a system according to claim 1 in the field of optical telecommunications.

9. A use according to claim 8, wherein the operating wavelength(s) of the system is/are situated around 1.3 μm or 1.55 μm.

10. A space-division optical switching system comprising a multichannel acousto-optical deflector between a plurality of inlet fibers and a plurality of outlet fibers, together with both a plurality of inlet microlenses for collimating beams from the inlet fibers on the deflector and also, downstream from the deflector, a Fourier lens with the said deflector being located in the focal plane thereof, the system including a second multichannel acousto-optical deflector disposed downstream from said lens in the image focal plane thereof, together with a plurality of outlet microlenses serving to focus the beams from the second deflector on the outlet fibers, wherein the deflectors on either side of the lens are identical, are controlled by the same ultrasound frequency comb, and are rotated through 90° relative to each other about the optical axis of said lens.

* * * * *